F. W. BOERNER.
WINDMILL PIPE ATTACHMENT.
APPLICATION FILED MAR. 26, 1919.
1,326,435.
Patented Dec. 30, 1919.
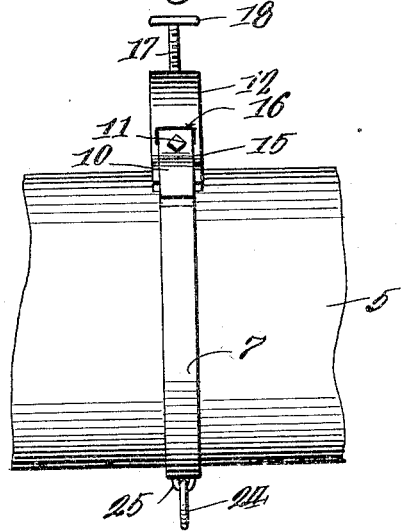
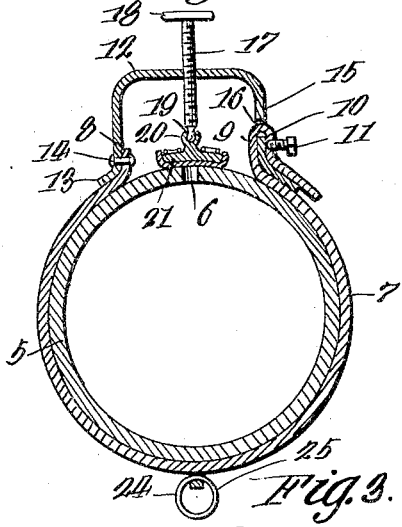
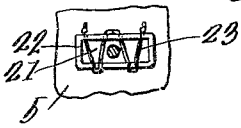
WITNESS:
Guy M. Spring
H. B. Vrooman
INVENTOR.
Frederick W. Boerner
BY
Richard B. Owen
ATTORNEY.

UNITED STATES PATENT OFFICE.

FREDERICK W. BOERNER, OF LUBBOCK, TEXAS.

WINDMILL-PIPE ATTACHMENT.

1,326,435. Specification of Letters Patent. Patented Dec. 30, 1919.

Application filed March 26, 1919. Serial No. 285,300.

*To all whom it may concern:*

Be it known that I, FREDERICK W. BOERNER, a citizen of the United States, residing at Lubbock, in the county of Lubbock and State of Texas, have invented certain new and useful Improvements in Windmill - Pipe Attachments, of which the following is a specification.

This invention relates to a windmill pipe attachment and has for its primary object the production of a structure which is detachably secured to the pipe for closing the vent opening therein.

Another object of this invention is the production of an efficient supporting means for carrying a set screw having a closure upon its inner end, whereby the damper may be moved to close the vent opening in the windmill pipe or may be shifted away from the pipe, thus permitting the pipe to drain through the opening.

A further object of this invention is the production of a windmill pipe attachment wherein a yoke is carried by the collar, which collar is supported upon the windmill pipe, thus permitting the device to be carried upon pipes of various sizes to allow the closure to be moved into position for easily closing the vent opening.

One practical form of construction and assembly of the present invention will be hereinafter described and is illustrated in the drawing, in which:—

Figure 1 is a side elevation of the attachment in use.

Fig. 2 is a sectional view through the attachment.

Fig. 3 is a plan view of the closure, a portion of the supporting pipe being fragmentarily shown.

In the preferred embodiment of the present invention, about to be described, for the purpose of illustrating the operation, the windmill pipe is shown at 5 having the usual vent opening 6. As shown in the present art the windmill pipe is provided with such an opening above the ground whereby during cold weather, the opening may be opened to allow the pipe to drain and thus prevent the same from freezing. However, during warm weather or when the windmill is in operation, the vent opening 6 is usually closed by a plug, although sometimes this plug blows out or sometimes freezes within the opening and numerous other objections occur which makes the use of such a device undesirable.

The present invention is designed to overcome the several objections noted. To accomplish this result, a collar 7 in the form of a strip or band of suitable metal which is substantially circular is positioned upon the pipe 5. This collar 7 has outwardly turned spaced apart ends 8 and 9, the end 9 being bent around to form a hook 10. The set-screw 11 is carried by the hook 10 for purpose to be hereinafter set forth.

A yoke 12 is also provided and this yoke is formed of a strip of metal substantially U-shaped as shown in Fig. 2. One end 13 of the yoke is riveted as indicated at 14 to the outturned end 8 of the collar 7. The opposite end 15 of the yoke has a slot 16 formed therethrough, whereby the hooked end 10 of the collar 7 may be passed through the slot for connecting the yoke with the collar. The set screw 11 may then be screwed into a binding engagement with the end 15 of the yoke 12 thus firmly connecting the yoke to the collar and preventing accidental disassembly of the device.

A set screw 17 is carried by the yoke 12 and has a head 18 on its outer end to facilitate rotation of the set screw. A ball 19 is carried on the inner end of the set screw 17 and this ball is received by a socket 20 carried upon a closure 21.

This closure 21 is in the form of a plate and has a piece of flexible material 22 carried upon its surface, this material being in the nature of leather or other suitable nature to conform to the shape of the closure 21, the sheet having its side edges bent around the side edges of the closure, as shown in Figs. 2 and 3. A strand of flexible wire 23 is passed through the upturned edges of the sheet 22 as shown in Fig. 3, thus firmly holding this sheet upon the closure.

In operation, the collar 7 is first slipped around the pipe 5 as shown in Figs. 1 and 2. At this time, of course, the yoke will be fixed upon the collar by the rivet 14. After the collar has been fixed upon the pipe the hooked end 10 thereof is passed through the slot 16 of the yoke and the set screw is adjusted, thus connecting the supporting means to the pipe. If it is then desired to close the vent opening 6, the ring 24 carried by the staple 25 upon the collar 7 may be gripped and the collar moved along the pipe until the closure 21 is in alinement with the said opening 6. At this time the head 18 may be turned for rotating the set screw 17 thus moving the closure inwardly toward the pipe until the sheet 22 is brought into a binding engagement with the surface of the pipe 5, at which time the closure will be over the vent opening 6 as illustrated in Fig. 2.

If the windmill then operates it is obvious the water will pass through the pipe without escaping from the vent opening 6. When however, it is desired to drain the pipe 5, the head 18 is moved in a counter direction and thus the movement of the set screw 17 will retract the closure away from the surface of the pipe 5. Therefore, as the vent opening 6 will be unobstructed the water within the pipe may be very easily drained therefrom.

Although the present invention has been specifically described as being used in connection with a windmill pipe attachment, it is obvious that the nature of the invention does not limit the same to this one use. It may also be used to constitute a temporary closure for leaks in water mains or other conduits or pipes through which liquid may pass, without departing from the spirit of the invention.

The foregoing description and accompanying drawings have reference to what might be considered to be the approved or preferred form of my invention. I desire it to be understood that I may make such changes in the construction, combination and arrangement of parts, materials dimensions, et cetera, as may prove expedient and fall within the scope of the appended claims.

Having thus fully described my invention what I claim as new and desire to secure by Letters Patent, is:—

1. A device of the class described comprising a supporting collar formed from a strip of material, said collar having spaced apart ends, one end terminating in a hook, a yoke formed from a strip of material and being substantially U-shaped, one end of said yoke being fixed upon one end of said collar, the remaining end of said yoke having a slot therein, said hooked end of said collar passing through said slot, a set screw carried by said hooked end and engaging the last mentioned end of said yoke for fixing the yoke upon the collar, and a movable closure means carried by said yoke.

2. A device of the class described, comprising a supporting means, a set screw carried by said supporting means and having a head for facilitating its rotation, a ball at the inner end of said set screw, a closure having a socket receiving said ball, a sheet of flexible material fitting upon the surface of said closure and having edges thereof fitting over the edges of said closure, a lacing means passing through the edges of said sheet and bearing upon the closure thus holding the sheet against displacement whereby the movement of the screw will move the closure to bring the sheet into a binding engagement with the surface to be engaged.

3. A device of the class described comprising a supporting collar formed from a strip of material, said collar having spaced apart ends, one end terminating in a hook, a yoke formed from a strip of material and being substantially U-shaped, one end of said yoke being fixed upon one end of said collar, the remaining end of said yoke having a slot therein, said hooked end of said collar passing through said slot, and a movable closure means carried by said yoke.

4. A device of the class described comprising a supporting collar, and a yoke fixedly connected together, said yoke having a slot therein, said collar having a hook, said hook passing through said slot, and a movable closure means carried by said yoke.

5. A device of the class described comprising a supporting means, a set screw carried by said supporting means, a closure engaged by the inner end of said set screw, a sheet of flexible material fitting upon the surface of said closure and having edges thereof fitting over the edges of said closure, a lacing means passing through the edges of said sheet and bearing upon the closure, thus holding the sheet against displacement, whereby the movement of the set screw will move the closure to bring the sheet into a binding engagement with a surface to be engaged thereby.

In testimony whereof I affix my signature in presence of two witnesses.

FREDERICK W. BOERNER.

Witnesses:
P. C. McCoy,
E. B. Pavery.